(12) United States Patent  
Mitsutani (10) Patent No.: US 12,054,137 B2
(45) Date of Patent: Aug. 6, 2024

(54) INFORMATION PROCESSING DEVICE, INFORMATION PROCESSING METHOD, NON-TRANSITORY STORAGE MEDIUM, AND VEHICLE

(71) Applicant: TOYOTA JIDOSHA KABUSHIKI KAISHA, Toyota (JP)

(72) Inventor: Noritake Mitsutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 443 days.

(21) Appl. No.: 17/469,175

(22) Filed: Sep. 8, 2021

(65) Prior Publication Data

US 2022/0144247 A1 May 12, 2022

(30) Foreign Application Priority Data

Nov. 10, 2020 (JP) .................................. 2020-187359

(51) Int. Cl.
  *B60W 20/20* (2016.01)
  *B60L 53/66* (2019.01)
  *B60L 58/12* (2019.01)

(52) U.S. Cl.
  CPC ............. *B60W 20/20* (2013.01); *B60L 53/66* (2019.02); *B60L 58/12* (2019.02)

(58) Field of Classification Search
  None
  See application file for complete search history.

(56) References Cited

U.S. PATENT DOCUMENTS

| | | | |
|---|---|---|---|
| 2006/0111825 | A1 | 5/2006 | Okada et al. |
| 2014/0075227 | A1 | 3/2014 | Shirota et al. |
| 2015/0234690 | A1 | 8/2015 | Ito et al. |
| 2015/0331422 | A1 | 11/2015 | Hartung et al. |
| 2017/0225589 | A1 | 8/2017 | Sikand et al. |
| 2020/0117756 | A1 | 4/2020 | Garimella et al. |
| 2020/0278957 | A1 | 9/2020 | Panelli |
| 2020/0320882 | A1* | 10/2020 | Fujii .................... G06Q 10/063 |
| 2021/0138982 | A1* | 5/2021 | Schumacher ........... H04L 63/08 |

FOREIGN PATENT DOCUMENTS

| | | |
|---|---|---|
| CN | 111332232 A | 6/2020 |
| EP | 3 617 022 A1 | 3/2020 |
| JP | 2006-142994 A | 6/2006 |
| WO | 2018/212083 A1 | 11/2018 |

* cited by examiner

Primary Examiner — Craig C Dorais
(74) Attorney, Agent, or Firm — Oliff PLC (57) ABSTRACT

An information processing device to be mounted on a vehicle includes a processor. The processor is configured to receive a first input as a request from an application via an application programming interface, convert the received first input into a second input that is an input for a manager to fulfill the request, and output the second input to the manager.

6 Claims, 10 Drawing Sheets

SERVICE APPLICATION (VALUE CREATION)
- SET ITEM USING TASK AND PROFILE
- CALL STANDARD API (COMMAND) TO BE USED
- DEFINE PRIORITY RANKS AND FREQUENCY RANKS (FOR POWER MANAGER)

STANDARD API ⇒ EXTERNAL MONITOR VIDEO RECORDING ⇒ (POWER MANAGER REQUIREMENT) ⇒ DATA UPLOAD ⇒ REPORT

COMMAND LIBRARY (STANDARD PF)
IN RESPONSE TO API CALL:
(1) DETAILING OF COMMAND FOR CORRESPONDING IMPLEMENTATION SYSTEM (→ TARGET INTEGRATED MANAGER, ETC)
(2) ACTIVATION COMMAND FOR ABSTRACT SYSTEM (→ POWER SUPPLY MANAGER)
(3) ELECTRIC ENERGY, POWER DEMAND ENTRY (→ POWER MANAGER)
(4) ISSUANCE OF EQUIPMENT POWER SUPPLY SERVICE EXECUTION TRIGGER (→ MOBILITY SYSTEM)

USE SYSTEM, MANAGER
- ADAS (EXTERNAL CAMERA) → 
- MM (VIDEO DATA PROCESSING) →
- DCM (WIRELESS COMMUNICATION) →

POWER SUPPLY MANAGER (ELECTRONIC INFRASTRUCTURE)
- OPERATION SYSTEM ACTIVATION (LOGICAL → PHYSICAL) → IGR, +BA, IGB
- HIGH-VOLTAGE POWER TRANSFER REQUEST → HV SYSTEM

POWER MANAGER (RESOURCE)
- DEMAND-SUPPLY ADJUSTMENT
- POWER TRANSFER CONTROL F/B → DCDC

DEMAND REJECTION (FOR EACH RANK)

MOBILITY SYSTEM CONTROL
- ELECTRIC MODE SWITCHING

FIG. 10

| SERVICE API | | SPECIFIED PLACE VIDEO RECORDING | DATA UPLOAD |
|---|---|---|---|
| (ASSOCIATED INFORMATION) | | CAMERA SHOOTING PERIOD, ETC. | TARGET FILE ID, SIZE, TRANSMISSION DESTINATION ID |
| COMMAND | OPERATION COMMAND | • CAMERA SHOOTING<br>• VIDEO DATA STORAGE | • TARGET FILE TRANSMISSION<br>• FILE DELETION AFTER TRANSMISSION |
| | SYSTEM ACTIVATION (POWER SUPPLY) | • ADVANCED SAFETY SYSTEM<br>• MULTIMEDIA | • MULTIMEDIA<br>• DCM (WIRELESS) |
| | POWER DEMAND | CALCULATION FROM OPERATION SYSTEM AND CAMERA SHOOTING PERIOD | CALCULATION FROM OPERATION SYSTEM AND FILE SIZE |
| | MODE SWITCHING | • ELECTRIC SERVICE<br>• AC CHARGING (IF AVAILABLE) | ← |

INFORMATION PROCESSING DEVICE, INFORMATION PROCESSING METHOD, NON-TRANSITORY STORAGE MEDIUM, AND VEHICLE

CROSS-REFERENCE TO RELATED APPLICATION

This application claims priority to Japanese Patent Application No. 2020-187359 filed on Nov. 10, 2020, incorporated herein by reference in its entirety.

BACKGROUND

1. Technical Field

The present disclosure relates to an information processing device to be mounted on a vehicle, an information processing method, a non-transitory storage medium, and a vehicle.

2. Description of Related Art

Japanese Unexamined Patent Application Publication No. 2006-142994 (JP 2006-142994 A) discloses a vehicle network system to be developed in a shorter development period even in a case of development of a complicated large-scale system. In this vehicle network system, a distributed control platform structure having a plurality of layers is constructed for a network spanning a plurality of electronic control units (ECU), and cooperative control is implemented by assigning separate roles to the individual layers.

SUMMARY

The system described in JP 2006-142994 A employs a control structure to which only preset requests are applicable assuming a vehicle control system scheme within a range of functions expected in advance as those of a vehicle. Therefore, the system described in JP 2006-142994 A is not suited to, for example, vehicle operations different from those preset in the control system, or new usage of the vehicle different from the original usage using vehicle devices.

For example, when a service provider attempts to provide a new or additional service for the vehicle later on, application developers of the service provider need to develop a service application while grasping details of the internal structure of the vehicle necessary to implement the new or additional service (for example, an electronic platform, a system configuration, and an energy system). Thus, problems arise in that the development period and operation costs increase due to complication of development.

The present disclosure provides an information processing device, an information processing method, a non-transitory storage medium, and a vehicle that can achieve easy function development for application developers.

In a first aspect of a technology of the present disclosure, an information processing device to be mounted on a vehicle includes a processor. The processor is configured to receive a first input as a request from an application via an application programming interface, convert the received first input into a second input that is an input for a manager to fulfill the request, and output the second input to the manager.

In the information processing device according to the first aspect of the technology of the present disclosure, the processor may be configured to convert the received first input into the second input including an input for a first manager and an input for a second manager. The first manager may be configured to manage control on a vehicle device to fulfill the request. The second manager may be configured to manage a power supply of the vehicle device that receives an instruction from the first manager. The processor may be configured to output the second input to the first manager and the second manager.

In the information processing device according to the first aspect of the technology of the present disclosure, the processor may be configured to open information to public. The information may be related to at least one of the second input, statuses of management by the first manager and the second manager, and a status of the vehicle device. The application may be configured to determine a start and an end of the request by referring to the information open to the public.

In a second aspect of the technology of the present disclosure, an information processing method to be executed by a processor of an information processing device to be mounted on a vehicle includes receiving a first input as a request from an application via an application programming interface, converting the received first input into a second input that is an input for a manager to fulfill the request, and outputting the second input to the manager.

In a third aspect of the technology of the present disclosure, a non-transitory storage medium stores instructions that are executable by one or more processors of an information processing device to be mounted on a vehicle and that cause the one or more processors to perform the following functions. The functions include receiving a first input as a request from an application via an application programming interface, converting the received first input into a second input that is an input for a manager to fulfill the request, and outputting the second input to the manager.

The information processing device according to the first aspect of the technology of the present disclosure may be mounted on a vehicle.

According to the information processing device of the present disclosure, the processor converts the first input into the second input. Thus, application developers can easily develop a function without being aware of, for example, an electronic platform, a system configuration, and an energy system of the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a conceptual diagram of functions of main components when executing parked-vehicle watchover camera shooting (Specific Example 2)

DETAILED DESCRIPTION OF EMBODIMENTS

An information processing device of the present disclosure provides functions of a control platform by a vehicle integrated ECU (central ECU) alone, an external cloud alone, or a combination of the vehicle integrated ECU and the external cloud. The control platform operates as a central brain configured to control overall operation and behavior of a vehicle. In the control platform, application developers can easily develop a new or additional service without being aware of, for example, the structure of the control platform, defined commands, the system configuration of the vehicle, and an energy system handled in the vehicle.

Embodiment

Configuration

Figure 1:
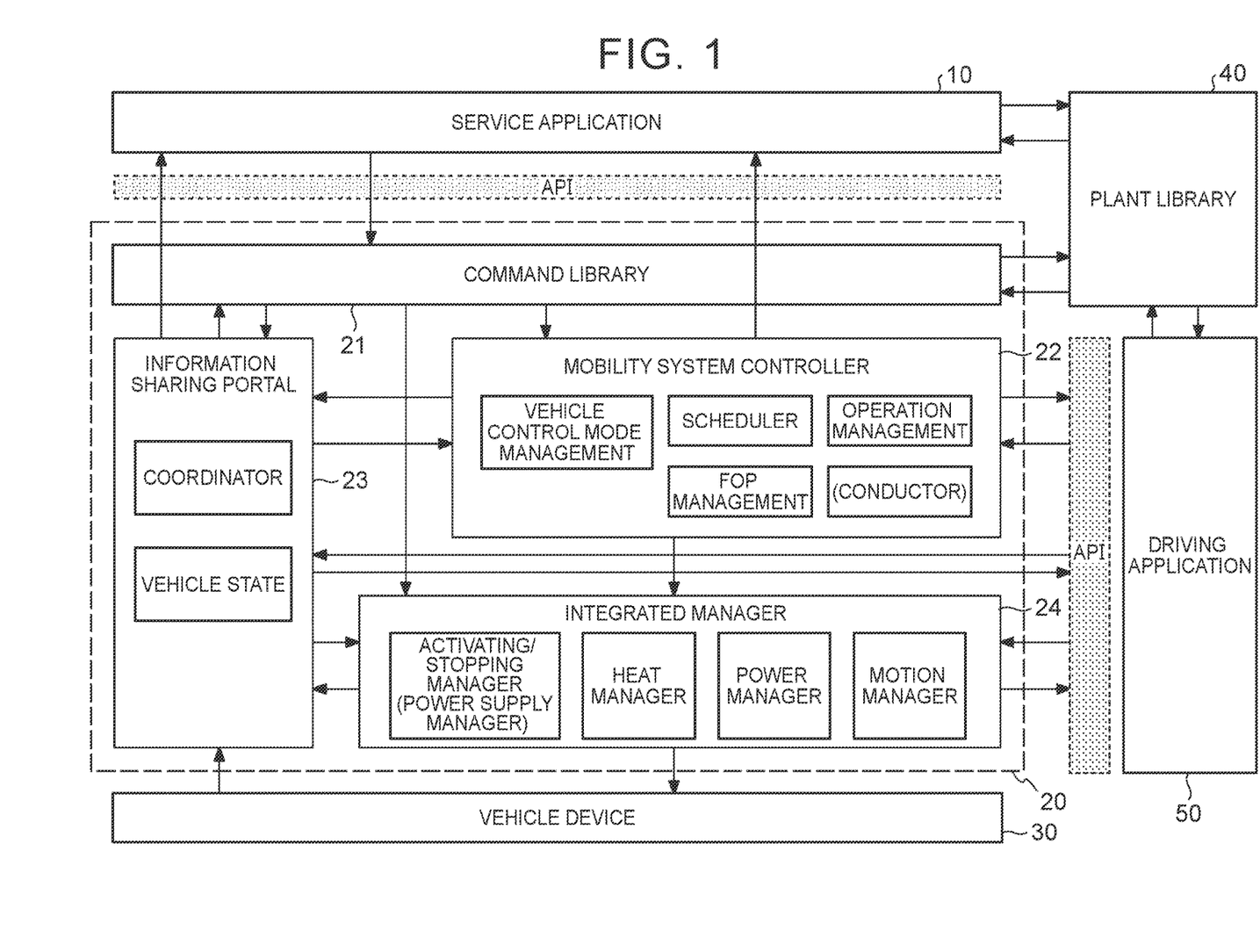
FIG. 1 is a functional block diagram of a vehicle control system including an information processing device according to one embodiment.

FIG. 1 is a functional block diagram of a vehicle control system including an information processing device 20 according to one embodiment of the present disclosure. The functional blocks exemplified in FIG. 1 include a service application 10, the information processing device 20, a vehicle device 30, a plant library 40, and a driving application 50. The information processing device 20 includes a command library 21, a mobility system controller 22, an information sharing portal 23, and an integrated manager 24. The vehicle control system is mounted on a vehicle such as an automobile.

1. Service Application 10

The service application 10 is a functional block including applications that implement services. The services are implemented by using pieces of information in the inside and outside of the vehicle and components of the vehicle. Examples of the services include real-time operations of the vehicle as an automobile or product, scheduling related to activation of applications (self and other applications) based on set times, collection and processing of databases, recording into recording media, and wireless transmission to the outside. The application of this embodiment is configured to request (call) an abstract command predefined in the command library 21 from the information processing device 20 via an application programming interface (API). The abstract request may include supplementary information (for example, expected service execution period, priority, or frequency). For example, a service provider can provide any service by programming the application using an API depending on purposes. The contents of the API open to business entities or the like may be changed depending on levels of software developers. Thus, the developers of the business entities or the like can easily develop an application for implementing a new function. In the development, there is no need to be aware of an electronic platform in the vehicle, the structures of devices in the vehicle (actuators or sensors), and an energy (electric or heat) system of the vehicle. Various applications may be exemplified as the applications. For example, the applications are related to a cockpit user experience (UX), a remote service, Mobility-as-a-Service (MaaS), an energy management service, and an over-the-air (OTA) update service.

The service application 10 requests various services from the command library 21 (first input). The service application 10 refers to shared information open to the public at the information sharing portal 23. The service application 10 inputs a trigger for an instruction to activate an application from the mobility system controller 22 to the information sharing portal 23. The service application 10 can exchange information with the plant library 40. Each application in the service application 10 is basically executed in the vehicle, but may partially be executed in the cloud.

2. Command Library 21

The command library 21 is a functional block including an abstract API. In response to an abstract service request (service API call) from the service application 10, this API implements control that corresponds to the service request. In other words, the command library 21 converts a request received from the service application 10 (first input) into a request for the integrated manager 24 or the mobility system controller 22 (second input). That is, the command library 21 is an example of "second processor". For example, the command library 21 includes a library of various commands for implementing the following functions in association.

(1) Function of implementing a single or complex operation command for the vehicle device 30 (such as an actuator). This operation command is a command for fulfilling a request received from the service application 10.

(2) Function of outputting (issuing) a switching trigger for a vehicle control mode. The vehicle control mode defines behavior of the vehicle (usage of the vehicle as a product).

(3) Function of activating and stopping a power supply. The power supply operates a system necessary to fulfill a request.

(4) Function of providing an instruction to adjust energy sources in response to an entered energy demand (demand merging, demand weighting, suppliability determination, and selection of sources).

(5) Function of registering shared information in the information sharing portal 23. The shared information is processed and/or generated by using various types of data.

(6) Function of storing necessary information in a storage and operating internal and external communication devices.

(7) Timer function for activating a specified application at a set time.

For example, the command library 21 outputs a trigger for an instruction to switch the vehicle control mode, transmits an operation schedule, and reports scheduling to the mobility system controller 22. The command library 21 outputs a control request or a service request (second input) to the integrated manager 24. That is, the command library 21 is an example of "third processor". The command library 21 receives various service requests (first input) from the service application 10. The command library 21 is an example of "first processor". The command library 21 can provide the information sharing portal 23 with application processing information to be open to the public. The command library 21 refers to shared information open to the public at the information sharing portal 23. The command library 21 can exchange information with the plant library 40.

3. Mobility System Controller 22

The mobility system controller 22 is a functional block configured to, for example, centrally manage a control condition related to behavior of the vehicle (usage or operation), manage progress of a series of tasks based on an operation schedule, and manage schedules. For example, the mobility system controller 22 has the following management functions.

(1) Vehicle Control Mode Management Function

The mobility system controller 22 manages overall control on the vehicle by using the following elements (plurality of modes and states). The mobility system controller 22 controls components of the vehicle device 30 and behavior of the system, and adjusts UX requests depending on situations of the vehicle (time, place, and occasion: TPO).

Main modes: determine the total usage of the vehicle depending on situations.

<automobile mode/electric mode/generator mode/stop mode>

States: manage transition of vehicle statues along with sequential control phases.

<traveling state (standby, start, travel, end)/motion state (hold, stop, startability determination, drive, stopping necessity determination)/transportation state (standby, stop, depart, move)/electric power infrastructure cooperation state (standby, ready, charge, supply)>

Sub-modes: limit purposes and means of control under one or more modes.

<driving sub-mode (manual, semi-automatic, full-automatic)/charging sub-mode (OFF, alternating current (AC), direct current (DC), contact, non-contact, solar)/equipment power supply sub-mode (OFF, electric service, movement preparation, loading and unloading of passengers, OTA)/auxiliary-device supplementation sub-mode (OFF, high voltage, solar)/AC power supply sub-mode (OFF, inside, outside)>

(2) Schedule Management Function (Scheduler)

The mobility system controller 22 schedules a start time and an end time of a specified activity or application. Examples of the scheduling include timer charging and pre-air conditioning.

(3) Operation Management Function

In the use of MaaS, the mobility system controller 22 manages progress of vehicle movement, transportation service (flows of persons and goods), stay service, and associated tasks (such as a conductor function) based on operation schedule tables.

(4) Fail Operation (FOP) Management Function

The mobility system controller 22 centrally manages Fail-safe and FOP in a personally owned vehicle (PoV) and in MaaS. For example, this function includes generation of reliability information of a main subsystem and system diagnosis as necessary.

The mobility system controller 22 outputs an instruction to permit or prohibit control and indices necessary for adjustment to the integrated manager 24. The mobility system controller 22 outputs a trigger for an instruction to activate an application to the service application 10. For example, the mobility system controller 22 acquires a trigger for an instruction to switch the vehicle control mode, an operation schedule, and scheduling from the command library 21. The mobility system controller 22 can provide the information sharing portal 23 with mobility system information (such as a control mode, an operation condition, and a UX adjustment result) to be open to the public. The mobility system controller 22 refers to shared information open to the public at the information sharing portal 23. The mobility system controller 22 can further provide mobility system information (such as a driving mode and a destination) to the driving application 50, and refer to information in the driving application 50.

4. Information Sharing Portal 23

The information sharing portal 23 is a functional block configured to aggregate globally open information (shared information). The functional blocks such as the service application 10, the command library 21, the mobility system controller 22, and the integrated manager 24 refer to the shared information. Reference can be made to the shared information also from the external cloud or control domains connected by communication from the vehicle integrated ECU (central ECU). Examples of the shared information include information on a state of the vehicle, a surrounding condition of the vehicle, scenes inside and outside the vehicle, results of detection of user's needs, and input values from sensors. Each functional block can refer to the shared information of the information sharing portal 23 without recognizing the source of generation (provision) of the shared information. The information sharing portal 23 may include a coordinator that can process information on, for example, a traveling scene of the vehicle (time, weather, and temperature), a result of authentication of a vehicle user, and a storage capacity.

The information sharing portal 23 opens the shared information to the service application 10, the command library 21, the mobility system controller 22, the integrated manager 24, the vehicle device 30, and the driving application 50. The information sharing portal 23 is an example of "fourth processor". The information sharing portal 23 can acquire application processing information openable to the public from the command library 21. The information sharing portal 23 can acquire mobility system information (such as a control mode, an operation condition, and a UX adjustment result) openable to the public from the mobility system controller 22. The information sharing portal 23 can acquire an adjustment result openable to the public from the integrated manager 24. The information sharing portal 23 can acquire general information (about sensors, communications, and analog signals) openable to the public from the vehicle device 30. The information sharing portal 23 may function as a gateway configured to output the general information acquired from the vehicle device 30 directly to the service application 10. The information sharing portal 23 can acquire a driving condition (such as a stop determination result) openable to the public from the driving application 50. The information open to the public at the information sharing portal 23 is basically registered (stored) in the vehicle. A part of the information may be registered (stored) in the cloud.

5. Integrated Manager 24

The integrated manager 24 is a functional block configured to execute adjustment related to, for example, limitation on a physical amount and whether to receive a request from the service application 10 (service API call) and determine a final command for the vehicle device 30 to fulfill the request based on a control condition of the mobility system controller 22 and various types of shared information that can be referred to at the information sharing portal 23. For example, the integrated manager 24 includes managers that manage the following functions. In this embodiment, the integrated manager 24 eliminates a difference caused by variations in equipment of the vehicle (hardware difference).

(1) System Activating/Stopping Manager (Power Supply Manager) Function

The integrated manager 24 controls activation and stop of a necessary system subordinate to the vehicle in response to a required service need, and outputs a command (power ON/OFF, network management (NM) trigger, or communication request).

(2) Power Manager Function

The integrated manager 24 efficiently controls consumption and supply of electric power, including charging, discharging, and voltage conversion in the vehicle. In this embodiment, the integrated manager 24 executes adjustment toward fair supply responding to all energy demands (electric power or electric energy) entered (including scheduling) in the vehicle, determines whether to permit a service, determines upper and lower limits of an electric power balance, and selects an electric power source (such as a high-voltage battery or a charger).

(3) Heat Manager Function

The integrated manager 24 efficiently controls demand and supply of heat to be exhausted from the vehicle or used for heating. In this embodiment, the integrated manager 24 adjusts heat generation requests (air conditioning or component temperature control) from the service application 10, and outputs a command to start an engine or activate a fuel cell (FC) within a range in which fuel efficiency and emission requirements are satisfied.

(4) Motion Manager Function

The integrated manager 24 adjusts requests for a motion system configured to control functions related to motions of the vehicle, such as "run", "turn", and "stop". In this embodiment, the integrated manager 24 reflects requirements in the mobility system controller 22 (traveling state, motion state, and transportation operation management) and new requests in the MaaS service (such as prohibition of start and request for or prohibition of termination of vehicle holding).

An instruction to permit or prohibit control and indices necessary for adjustment are input to the integrated manager 24 from the mobility system controller 22. A control request (or a service request) is input to the integrated manager 24 from the command library 21. The integrated manager 24 may function as a gateway configured to output the control request input from the command library 21 directly to the vehicle device 30. The integrated manager 24 outputs adjusted commands (for actuators, communications, or driver outputs) to the vehicle device 30. The integrated manager 24 can provide the information sharing portal 23 with an adjustment result of each manager to be open to the public. The integrated manager 24 refers to, for adjustment, shared information open to the public at the information sharing portal 23. The integrated manager 24 can provide the driving application 50 with an answerback or an adjustment result of the motion manager. The integrated manager 24 can refer to information related to a vehicle motion (such as an acceleration and a steering angle) requested by the driving application 50.

In addition to the managers described above, the integrated manager 24 may include, for example, a human machine interface (HMI) manager configured to control functions related to electric equipment control (usability) for appropriately displaying information on a navigation screen and meters of the vehicle and appropriately providing operations on the vehicle.

6. Vehicle Device 30

The vehicle device 30 is a functional block including devices such as sensors and actuators where control information, operation requests, data, and signals are input and output finally. Examples of the vehicle device 30 include a sensor configured to acquire information indicating a surrounding condition of the vehicle and information indicating a state of the vehicle, and a sensor configured to acquire information on driver's driving operations for the vehicle (such as operations on an accelerator, a brake, a steering wheel, and a shift lever). Examples of the vehicle device 30 also include a device to be used for activating an air conditioning system (IGP), a device to be used for activating a vehicle motion system (IGR), and an actuator of a starter (ST) configured to control activation of the engine.

Adjusted commands (for actuators, communications, or driver outputs) are input to the vehicle device 30 from the integrated manager 24. The vehicle device 30 can provide the information sharing portal 23 with general information (about sensors, communications, and analog signals) to be open to the public.

7. Plant Library 40

The plant library 40 is a functional block configured to provide environments such as artificial intelligence (AI) or machine learning algorithms, databases viewable from inside and outside of the vehicle, and a simulator configured to execute various simulations (such as estimation of a remaining charging period and map conversion) for use in improvement of controllability of the service application 10. The environments may partially or entirely be installed in the vehicle, or may be located in the cloud.

The plant library 40 can request necessary information from the service application 10, the command library 21, and the driving application 50 via a predetermined API. The plant library 40 can cause the service application 10, the command library 21, and the driving application 50 to acquire information indicating results of predetermined processes (such as simulations). The functions of the plant library 40 are basically installed in the vehicle, but may partially be executed in the cloud.

8. Driving Application 50

Among the applications installed in the vehicle, the driving application 50 is dedicated to driving of the vehicle and assistance of the driving, and is not included in the service application 10. Examples of the driving application 50 include remote driving such as autonomous parking, autonomous driving (AD), autonomous driving in MaaS (Autono-MaaS), and an advanced driver assistance system (ADAS).

The driving application 50 can refer to information (such as a driving mode and a destination) open to the public at the mobility system controller 22 via a predetermined vehicle driving API. The driving application 50 can cause the mobility system controller 22 to refer to information. The driving application 50 can provide a driving condition (such as a stop determination result) to the information sharing portal 23. The driving application 50 can acquire shared information (various types of data) open to the public at the information sharing portal 23. The driving application 50 can request a vehicle motion (such as an acceleration and a steering angle) toward the integrated manager 24. The driving application 50 can receive an answerback (such as an adjustment result) from the integrated manager 24. The driving application 50 can exchange information with the plant library 40. Each application in the driving application 50 is basically executed in the vehicle, but may partially be executed in the cloud.

Since the vehicle control system of this embodiment includes the functional blocks described above, the vehicle control system can implement various services by simply installing applications developed without being aware of, for example, the structure of the control platform, the defined commands, the system configuration of the vehicle, and the energy system handled in the vehicle.

Control

Specific examples of the services to be implemented in the vehicle control system of the present disclosure are described with reference to FIG. 2 to FIG. 10.

SPECIFIC EXAMPLE 1

Specific Example 1 is an example of executing "remote air conditioning" for remotely controlling air conditioning in a vehicle cabin before driving the vehicle. The remote air conditioning is executed by using an application dedicated to the remote air conditioning (remote air conditioning application) installed in the service application 10. Specific Example 1 is also an example of executing "driveaway" for using the vehicle as an automobile by the user riding on the vehicle during the remote air conditioning. The driveaway is executed by using a starting application (for driveaway) installed in the service application 10.

Figure 2:
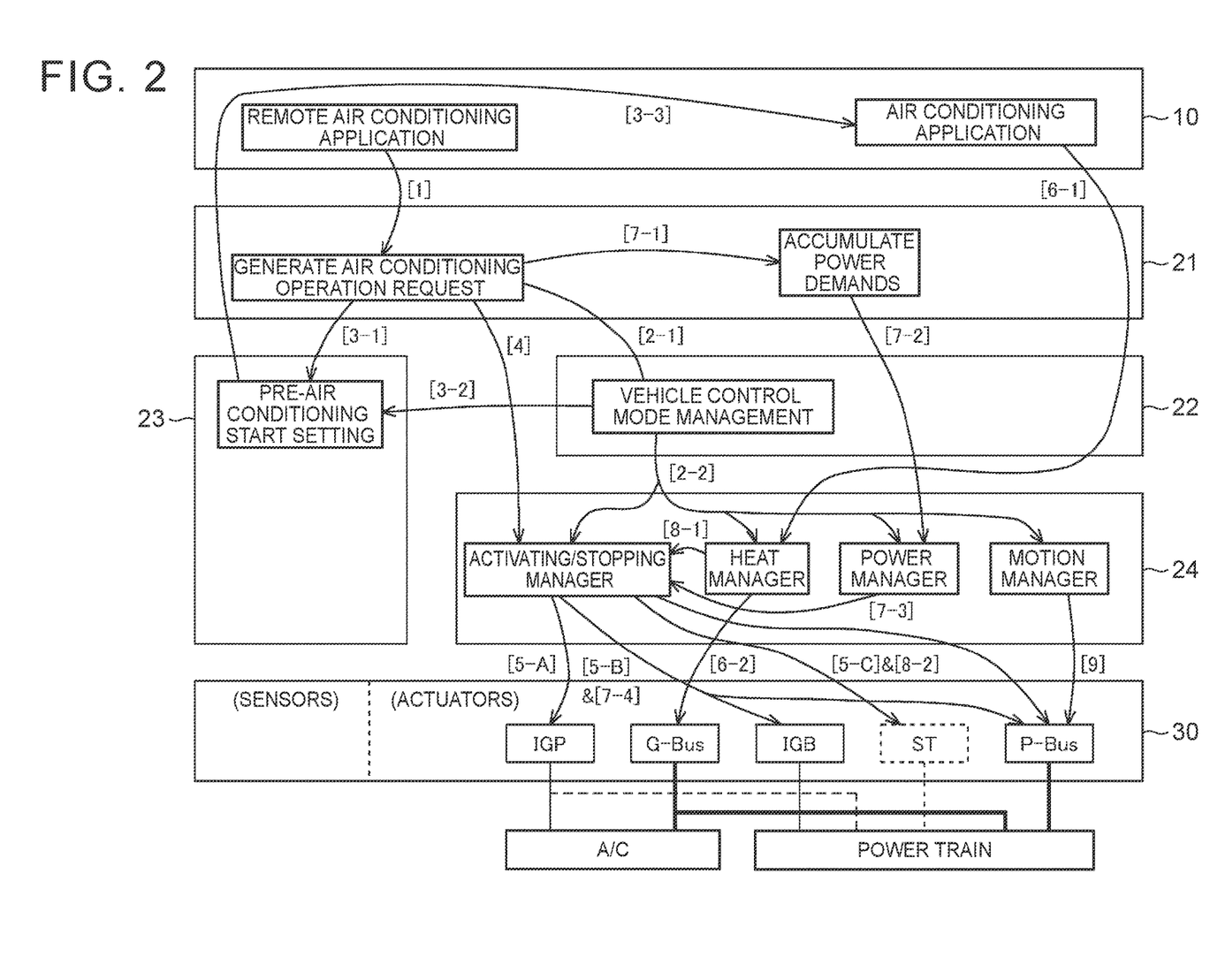
FIG. 2 illustrates an example of a detailed process flow among functional blocks when executing remote air conditioning (Specific Example 1)

FIG. 2 illustrates an example of a detailed process flow among the functional blocks when the remote air conditioning is executed. In the process flow exemplified in FIG. 2, the remote air conditioning application in the service application 10 first calls a pre-air conditioning operation command in the command library 21 ([1] in FIG. 2). More specifically, the central ECU (not illustrated) is activated by an NM trigger received from a data communication module (DCM) mounted on the vehicle. In the command library 21, an air conditioning operation request is generated based on the called command.

The mobility system controller 22 switches the vehicle control mode to the "electric mode" based on the air conditioning operation request generated in the command library 21 ([2-1] in FIG. 2). Information indicating that the vehicle is switched to the electric mode is issued to the system activating/stopping manager (activating/stopping manager), the heat manager, the power manager, and the motion manager of the integrated manager 24 ([2-2] in FIG. 2).

The command library 21 determines whether to start the pre-air conditioning, and registers information on a setting for starting the pre-air conditioning (pre-air conditioning start setting) in the information sharing portal 23 ([3-1] in FIG. 2). The mobility system controller 22 registers the information on the electric mode by including this information in the pre-air conditioning start setting ([3-2] in FIG. 2). An application for controlling the air conditioning of the vehicle (air conditioning application) is installed in the service application 10. The air conditioning application confirms that a pre-air conditioning mode is executed by referring to the information on the pre-air conditioning start setting open to the public at the information sharing portal 23 ([3-3] in FIG. 2).

The command library 21 transmits a need to use the air conditioning system (A/C) to the activating/stopping manager of the integrated manager 24 ([4] in FIG. 2).

The activating/stopping manager of the integrated manager 24 activates a corresponding power supply, system, and bus based on the vehicle control mode and the activity need. Specifically, when the vehicle is an automobile including an internal combustion engine (conventional vehicle) or a hybrid electric vehicle (HEV), the activating/stopping manager activates a power supply (IGP) to be used for activating the air conditioning system (A/C) ([5-A] in FIG. 2). When the vehicle is a hybrid electric vehicle (HEV), a battery electric vehicle (BEV), or a plug-in hybrid electric vehicle (PHEV), the activating/stopping manager activates a power supply (IGB) to be used for activating a power train unit, and transmits a power train activation request via a P-Bus ([5-B] in FIG. 2). When the vehicle is an engine vehicle (conventional vehicle), the activating/stopping manager outputs a signal for starting the starter (ST) ([5-C] in FIG. 2).

The air conditioning application issues a heat request to the heat manager of the integrated manager 24 ([6-1] in FIG. 2). The heat manager adjusts the heat request, and then transmits a command that is based on an adjustment result to the air conditioning system (A/C) via a global bus (G-Bus) ([6-2] in FIG. 2).

The command library 21 accumulates power demands ([7-1] in FIG. 2). The command library 21 issues a request that is based on the accumulated power demands to the power manager of the integrated manager 24 ([7-2] in FIG. 2). The power manager executes adjustment related to power demand-supply. The power manager transmits, to the activating/stopping manager of the integrated manager 24, information indicating a need to activate a high-voltage system based on an adjustment result ([7-3] in FIG. 2). In response to the information transmitted from the power manager, the activating/stopping manager activates the power supply (IGB) to be used for activating the high-voltage system, and transmits a high-voltage system activation request via the P-Bus ([7-4] in FIG. 2).

Depending on situations, the heat manager of the integrated manager 24 transmits information indicating a need to generate heat to the activating/stopping manager of the integrated manager 24 ([8-1] in FIG. 2). When the vehicle is a hybrid electric vehicle (HEV) or a plug-in hybrid electric vehicle (PHEV), the activating/stopping manager outputs a signal for starting the starter (ST) in response to the information transmitted from the heat manager ([8-2] in FIG. 2).

The remote air conditioning is a service to be provided while the vehicle is parked. Therefore, when the vehicle is an engine vehicle (conventional vehicle), the motion manager of the integrated manager 24 transmits a driving force generation prohibition request (EFi) via the P-Bus ([9] in FIG. 2).

Figure 3:
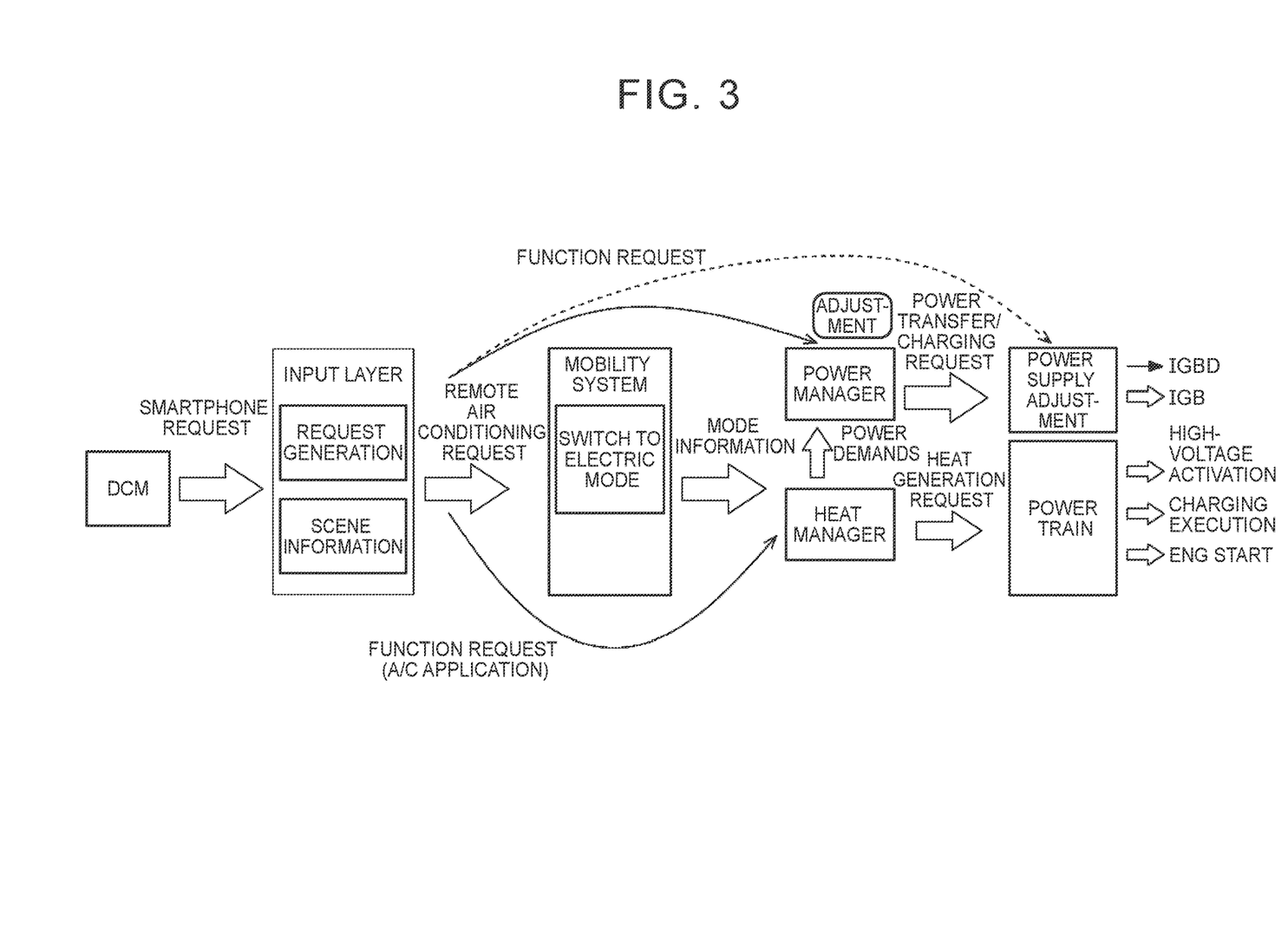
FIG. 3 illustrates an example of a general concept of the process flow of FIG. 2.

FIG. 3 illustrates an example of a general concept of the process flow of FIG. 2. In the example of FIG. 3, a request related to the air conditioning operation (smartphone request) is input to an input layer from a user's smartphone via the data communication module (DCM) mounted on the vehicle. In the input layer, determination is made that the vehicle is preparing prior to operation based on scene information. In the input layer, a remote air conditioning request is generated and output to a mobility system. In response to the remote air conditioning request, function requests are made on the heat manager, the power manager, and power supply adjustment. The mobility system interprets the remote air conditioning as a service while the vehicle is parked regardless of its method, and switches the main mode of the vehicle control mode to the "electric mode". Information on the electric mode is transmitted to the heat manager and the power manager of the integrated manager 24. The heat manager and the power manager execute demand-supply adjustment based on the power demands. Based on an adjustment result, the power manager outputs a power transfer/charging request for the power supply adjustment. Based on the adjustment result, the heat manager outputs a heat generation request to the power train unit. Based on those requests, appropriate control (power supply variation smoothing, IGBD activation, IGB activation, high-voltage activation, charging execution, and engine (Eng) start) is executed in the power supply adjustment and the power train. In the power train, the engine is started irrespective of a non-traveling status or a plug status.

Figure 4:
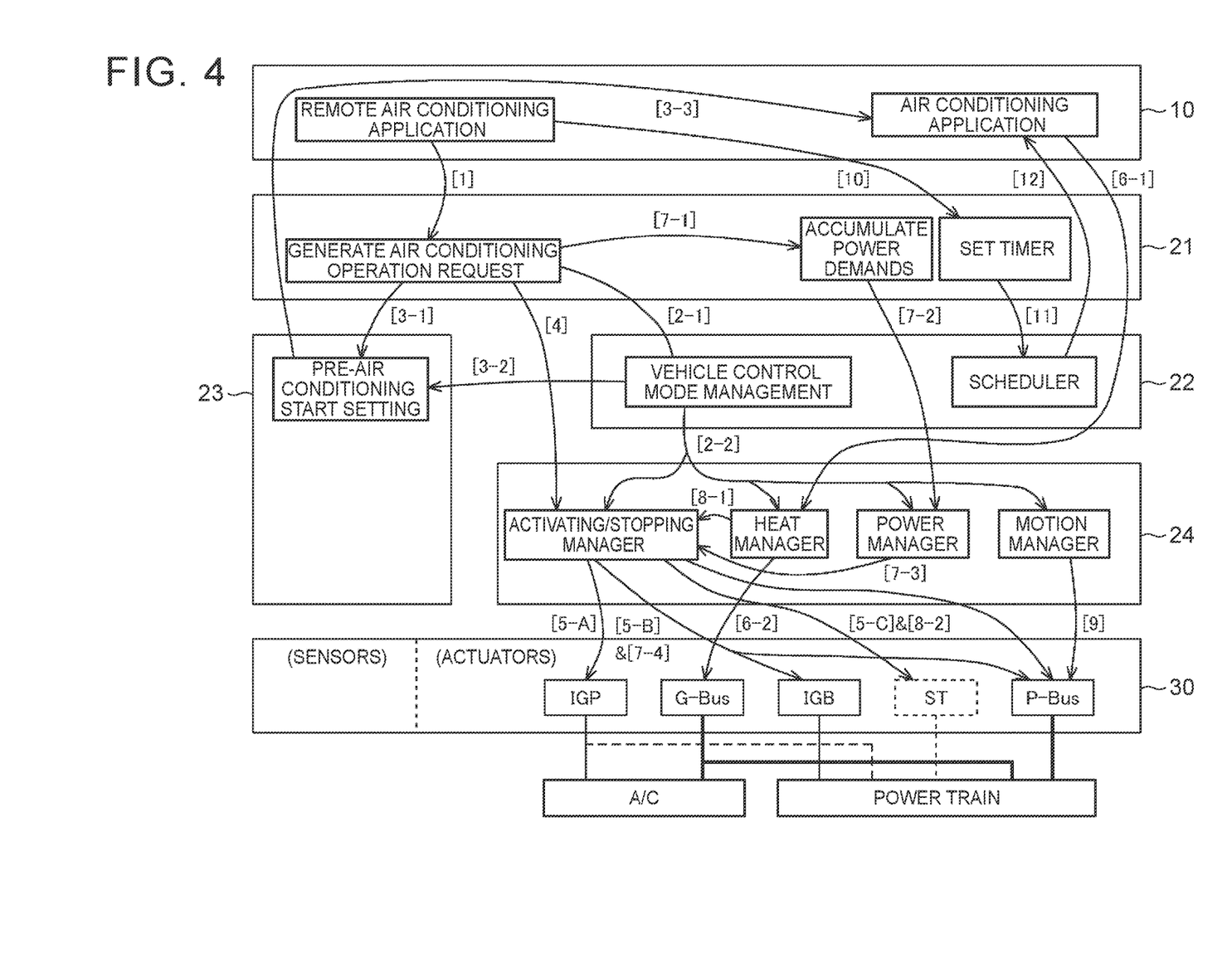
FIG. 4 illustrates an example of a detailed process flow among the functional blocks when executing the remote air conditioning at a time set on a timer.

FIG. 4 illustrates an example of a detailed process flow among the functional blocks when executing the remote air conditioning described in FIG. 2 at a time set on a timer. In the process flow exemplified in FIG. 4, the following processes are added to the process flow of FIG. 2.

The remote air conditioning application in the service application 10 calls a command to schedule activation of the air conditioning system (A/C) at a preset time in the command library 21 ([10] in FIG. 4).

The command library 21 sets, in the scheduler of the mobility system controller 22, the time to activate the air conditioning system (A/C) by the timer (timer pre-air conditioning setting) ([11] in FIG. 4).

When the time reaches the set time, the scheduler of the mobility system controller 22 issues an activation command to the remote air conditioning application in the service application 10 ([12] in FIG. 4).

When the service application 10 includes an application for customizing the operation procedure, the procedure can freely be customized with sensory logic including only the call in the command library 21. Examples of the customization include starting of the pre-air conditioning by a jump-start operation during plug-in charging.

Figure 5:
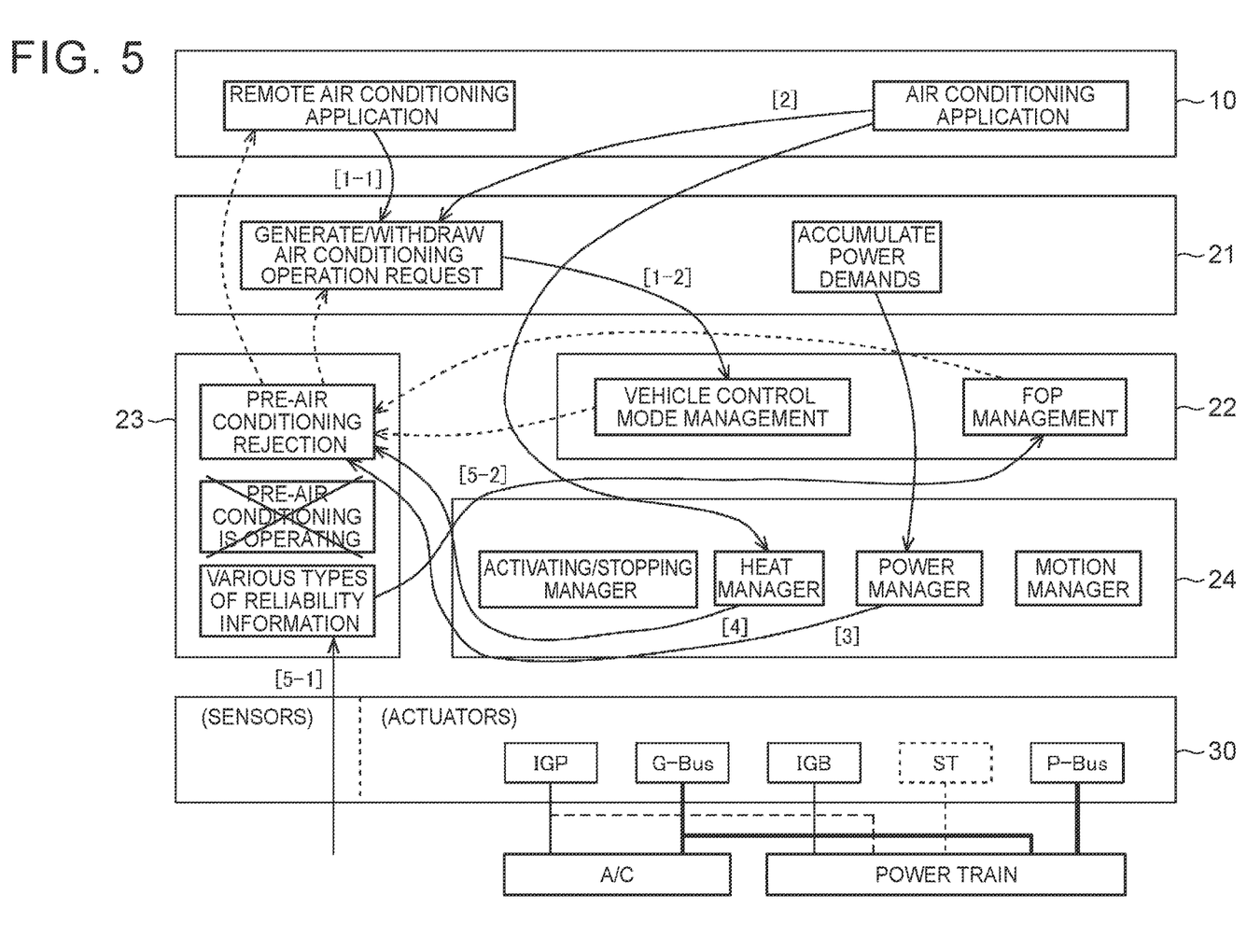
FIG. 5 illustrates an example of a detailed process flow among the functional blocks when aborting or terminating the remote air conditioning.

FIG. 5 illustrates a detailed process flow among the functional blocks when aborting or terminating the remote air conditioning that is being executed. For example, the remote air conditioning may be aborted or terminated in any one of the following patterns.

(1) A pattern in which a termination request is issued from the remote air conditioning application in the service application 10 ([1-1, 1-2] in FIG. 5). In this pattern, the remote air conditioning application recognizes a rejecting status by referring to pre-air conditioning rejection information open to the public at the information sharing portal 23 when transition cannot be made to the pre-air conditioning operation in UX adjustment depending on a mode and state of the vehicle control mode (during use for movement, emergency power generation, OTA, or the like). The remote air conditioning application withdraws the air conditioning operation request. In this case, the user or the like may be notified about the termination of the pre-air conditioning depending on needs.

(2) A pattern in which a pre-air conditioning termination condition is satisfied in the air conditioning application in the service application 10 ([2] in FIG. 5). As an example of this pattern, the air conditioning application withdraws the air conditioning operation request when an operation duration is equal to or shorter than a preset period (predetermined minutes).

(3) A pattern in which the power manager of the integrated manager 24 determines termination of electric power supply ([3] in FIG. 5). As an example of this pattern, pre-air conditioning rejection information is registered in the information sharing portal 23 when the total used electric energy is equal to or larger than a preset electric energy (predetermined kilowatt-hours) or the state of charge (SOC) is equal to or lower than a preset state of charge (predetermined percent). The air conditioning operation request is withdrawn based on the pre-air conditioning rejection information open to the public at the information sharing portal 23.

(4) A pattern in which the heat manager of the integrated manager 24 determines termination of permission for the heat generation request ([4] in FIG. 5). As an example of this pattern, pre-air conditioning rejection information is registered in the information sharing portal 23 when the total fuel consumption is equal to or larger than a preset fuel consumption (predetermined milligrams). The air conditioning operation request is withdrawn based on the pre-air conditioning rejection information open to the public at the information sharing portal 23.

(5) A pattern in which a forced termination (abort) is determined due to an abnormality of a related system through the FOP management of the mobility system controller 22 ([5-1, 5-2] in FIG. 5). As an example of this pattern, pre-air conditioning rejection information is registered in the information sharing portal 23 by the FOP management based on various types of reliability information input via sensors of the vehicle device 30. The air conditioning operation request is withdrawn based on the pre-air conditioning rejection information open to the public at the information sharing portal 23.

Figure 6:
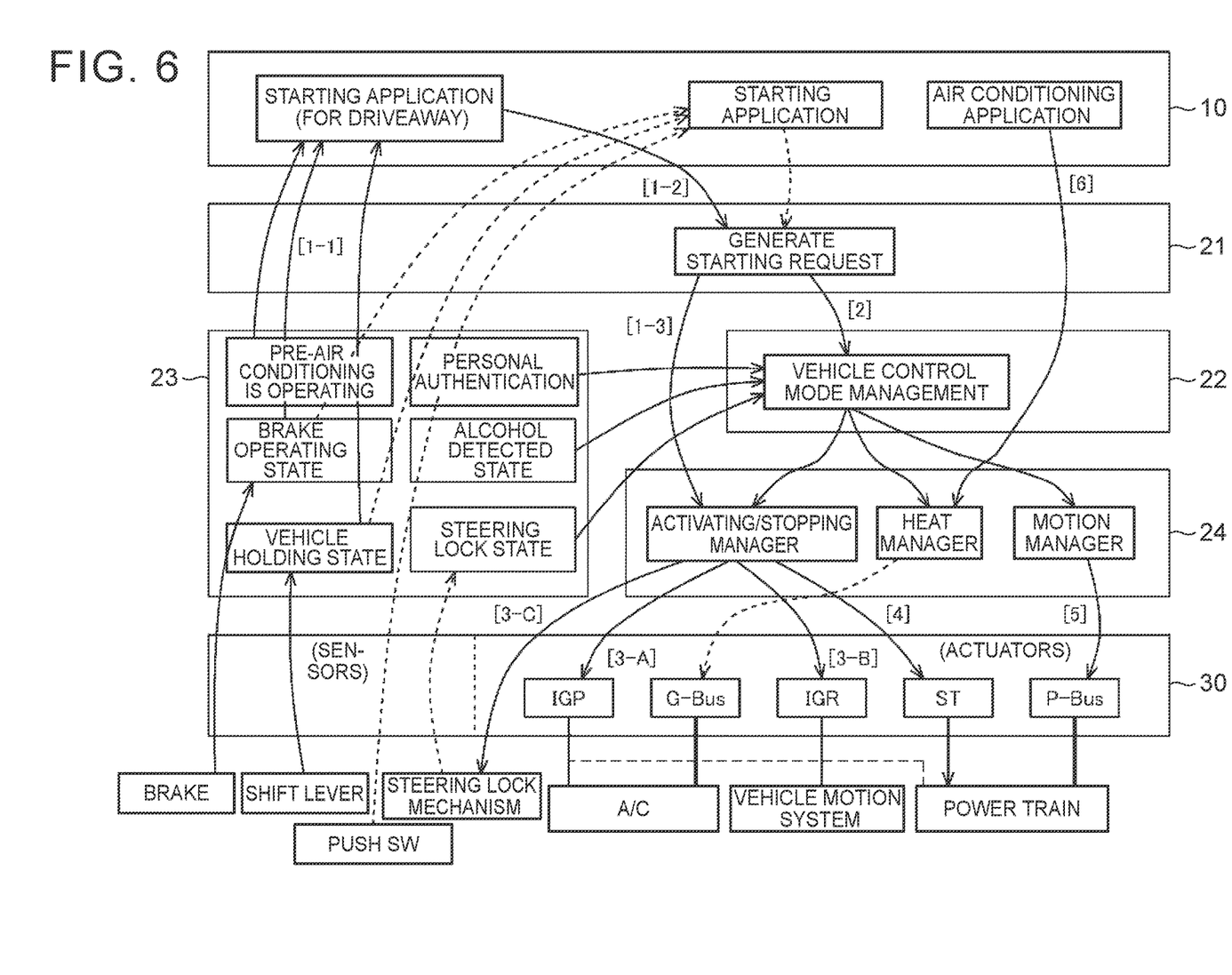
FIG. 6 illustrates an example of a detailed process flow among the functional blocks when executing driveaway during the remote air conditioning.

FIG. 6 illustrates an example of a detailed process flow among the functional blocks when the driveaway is executed during the remote air conditioning. In the process flow exemplified in FIG. 6, the starting application (for driveaway) in the service application 10 checks information open to the public at the information sharing portal 23 and indicating that the pre-air conditioning is being executed and an operation on the brake is executed ([1-1] in FIG. 6). The starting application calls a starting request command in the command library 21 ([1-2] in FIG. 6). In the command library 21, a starting request is generated based on the called command. The command library 21 transmits a starting need to the activating/stopping manager of the integrated manager 24 ([1-3] in FIG. 6).

The command library 21 issues, to the mobility system controller 22, a trigger for switching the main mode of the vehicle control mode to the "automobile mode" and a trigger for causing the traveling state to transition to "start" ([2] in FIG. 6). In response to the triggers, the mobility system controller 22 switches the vehicle control mode. Information that the vehicle control mode is switched is issued to the activating/stopping manager, the heat manager, and the motion manager of the integrated manager 24.

The activating/stopping manager of the integrated manager 24 executes the following processes along with the switching of the main mode of the vehicle control mode to the "automobile mode".

A process of activating a drive system and keeping the operation of the air conditioning system (A/C) (keeping the activation status of the power supply (IGP)) ([3-A] in FIG. 6).

A process of activating a power supply (IGR) to activate a vehicle motion system ([3-B] in FIG. 6).

A process of releasing a steering lock mechanism ([3-C] in FIG. 6).

The activating/stopping manager of the integrated manager 24 brings the operation status of a hybrid electric vehicle (HEV), a battery electric vehicle (BEV), or a plug-in hybrid electric vehicle (PHEV) into a ready state (Ready-ON) under the conditions that the starting request is issued from the starting application and the traveling state of the vehicle control mode transitions to "start". Therefore, an ST signal is output ([4] in FIG. 6). In the case of an engine vehicle (conventional vehicle), the condition may be set such that the engine is combusted completely.

After the traveling state of the vehicle control mode transitions to "travel" by "Ready-ON", the motion manager of the integrated manager 24 transmits, via the P-Bus, a request to terminate the prohibition of the driving force generation (output) ([5] in FIG. 6).

The air conditioning application in the service application 10 continues the operation in the "automobile mode" as the main mode of the vehicle control mode ([6] in FIG. 6).

Figure 7:
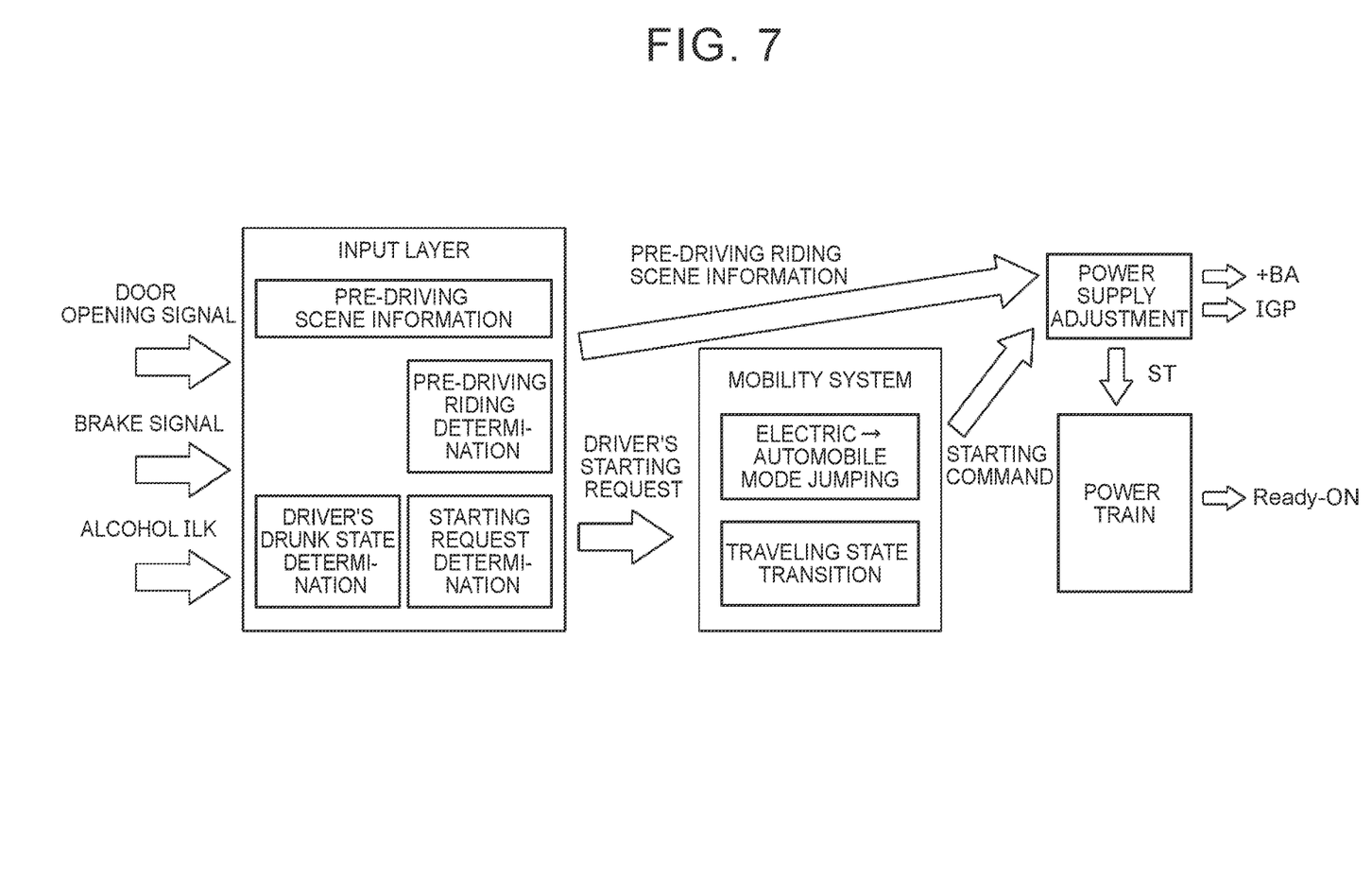
FIG. 7 illustrates an example of a general concept of the process flow of FIG. 6.

FIG. 7 illustrates an example of a general concept of the process flow of FIG. 6. In the example of FIG. 7, a door opening signal indicating a door opening/closing status, a brake signal indicating a status of the brake, and alcohol ILK information indicating that the driver has drunk alcohol are input to the input layer. In the input layer, pre-driving riding determination, driver's drunk state determination, and starting request determination are made based on various types of input information and pre-driving riding scene information. Based on determination results, a driver's starting request is generated and output to the mobility system. The pre-driving riding scene information is used for power supply adjustment. Based on the driver's starting request, the mobility system switches the main mode of the vehicle control mode from the "electric mode" to the "automobile mode" (mode jumping). The mobility system causes the traveling state of the vehicle control mode to transition to "start", and outputs a starting command for the power supply adjustment. Based on the information and the command described above, appropriate control (+BA activation of power supply before riding, IGP activation, ST signal output, and ready status (Ready-ON) switching) is executed in the power supply adjustment and the power train.

Figure 8:
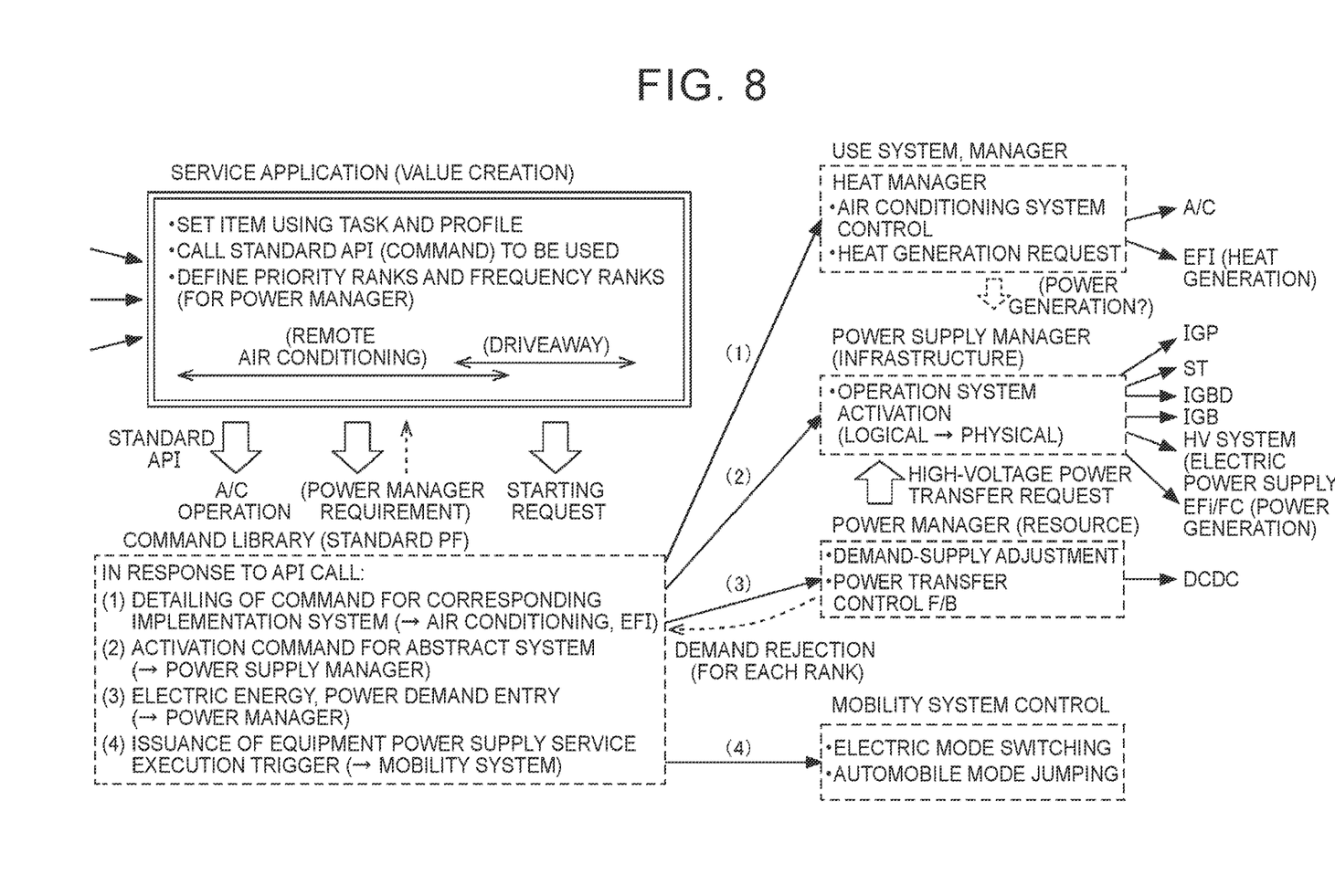
FIG. 8 is a conceptual diagram of functions of main components when executing the remote air conditioning and the driveaway (Specific Example 1)

FIG. 8 illustrates a brief functional concept in the main components when the remote air conditioning and the driveaway are executed in Specific Example 1. As in the example of FIG. 8, in the technology of the present disclosure, commands are called from the service application 10 to the command library 21 via a standard API. In response to the call, the command library 21 converts the commands into vehicle control commands for necessary functional blocks. The command library 21 automatically assigns and outputs requests and commands ((1) to (4)) to the respective functional blocks, thereby implementing the remote air conditioning and the driveaway.

SPECIFIC EXAMPLE 2

Specific Example 2 is an example of executing "parked-vehicle watchover camera shooting" for shooting a video around the vehicle for a predetermined period. The camera shooting is executed when an acceleration sensor (G sensor) mounted on the vehicle makes a response in the parked vehicle to determine that vehicle burglary may take place.

In Specific Example 2, the vehicle is regarded as being burglarized when the G sensor mounted on the vehicle makes a response during parking. An on-board camera for advanced safety equipment (such as ADAS) is used to shoot a video around the vehicle for a preset period. The shot video is recorded as a file in a storage area of multimedia. The recorded video file is uploaded to a predetermined center by a wireless communication device (DCM) mounted on the vehicle after the camera shooting. Simultaneously with the uploading, the response of the G sensor mounted on the vehicle is reported to the user of the vehicle (for example, to the user's smartphone).

FIG. 9 illustrates a brief functional concept in the main components when the parked-vehicle watchover camera shooting is executed in Specific Example 2. As in the example of FIG. 9, in the technology of the present disclosure, commands are called from the service application 10 to the command library 21 via a standard API. In response to the call, the command library 21 converts the commands into vehicle control commands for necessary functional blocks. The command library 21 automatically assigns and outputs requests and commands ((1) to (4)) to the respective functional blocks, thereby implementing the parked-vehicle watchover camera shooting.

Figure 10:
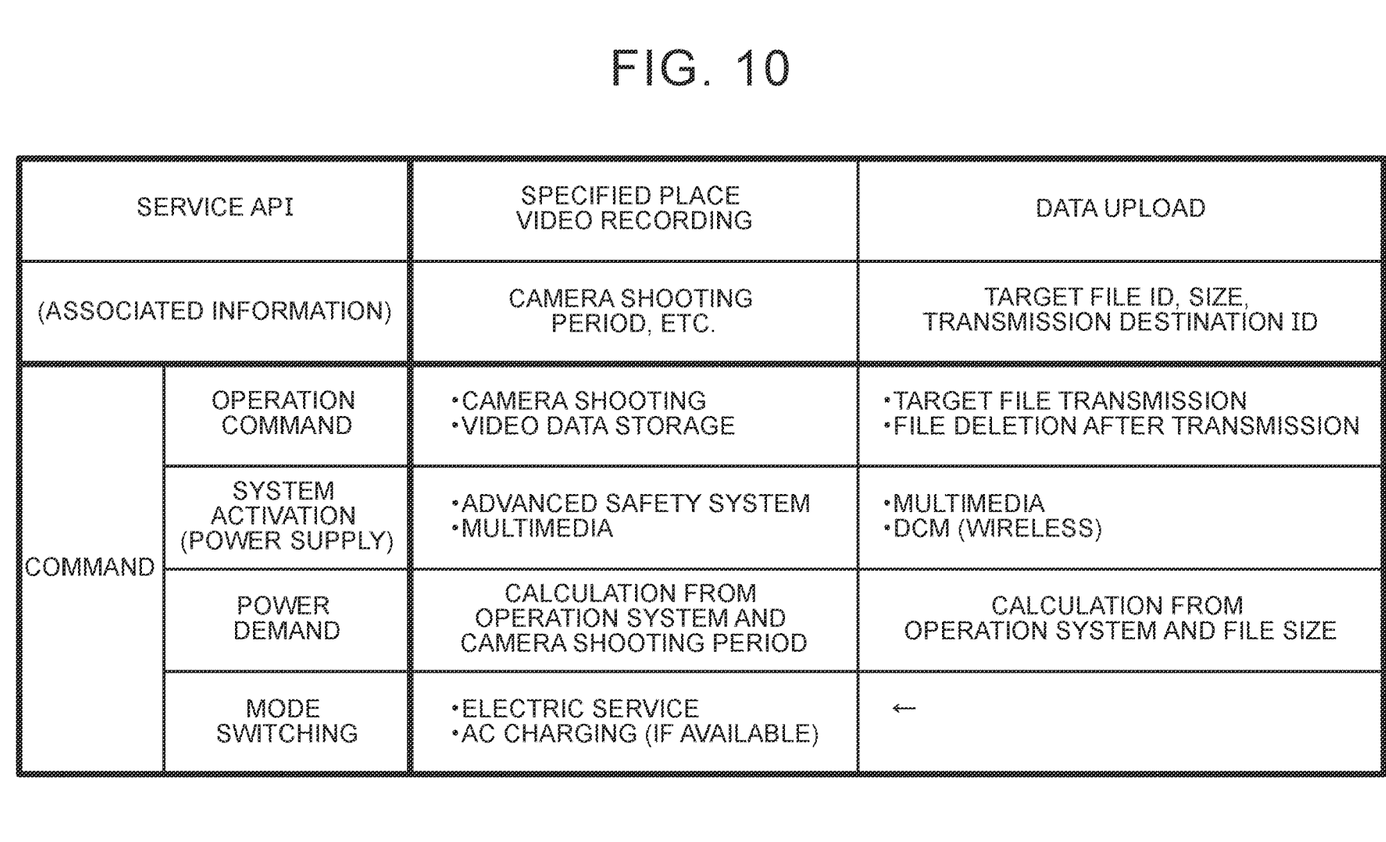
FIG. 10 is a diagram for describing relationships between service application programming interfaces (APIs) and processes on functional blocks associated with commands in Specific Example 2.

FIG. 10 is a diagram illustrating an example of service APIs (standard APIs) called by the service application 10 and processes (control) to be executed by the command library 21 on the functional blocks in association with commands in Specific Example 2. As illustrated in FIG. 10, abstract requests such as "specified place video recording" and "data upload" are only made from the service application 10 to implement control and commands on the functional blocks via the command library 21 to full the requests. Effects etc.

As described above, the information processing device according to the embodiment of the present disclosure includes in advance the library of various commands that can automatically determine, by simply calling predetermined abstract commands in a control architecture that can implement activities, the complex actuator operation adjustment, the power supply activation for activating a necessary system, the energy supply adjustment responding to energy demand (possibility determination and energy source selection), and the mode switching for determining the overall behavior of the vehicle.

Thus, application developers can easily develop a new or additional application (service) by designing an algorithm intuitively for its purpose. In the development, the application developers need not be aware of, for example, the structure of the electronic platform in the vehicle, the defined commands, the system configuration (hardware variations), and the energy system.

In the information processing device according to this embodiment, reference is made to the information in the sharing portal and the command library is used. There is no need to revise related applications. That is, any function can be added by simply installing a new or additional application alone.

The application developers can easily develop a new or additional application.

In the information processing device according to this embodiment, therefore, it is possible to avoid an increase in the number of inspection steps to find malfunction due to unexpected behavior of the vehicle or the number of inspection steps to check control interference through the behavior of the input/output interfaces (I/Fs) in the hierarchical structure.

Although the technology of the present disclosure is described above based on the embodiment, the present disclosure can be regarded not only as the information processing device, but also as, for example, a method to be executed by the information processing device including a processor and a memory, a program for the method, a non-transitory computer-readable recording medium storing the program, or a vehicle including the information processing device.

The present disclosure is useful in an information processing device to be mounted on a vehicle or the like.

What is claimed is:

1. An information processing device to be mounted on a vehicle, the information processing device comprising a processor configured to:
   receive a first input via an application programming interface, the first input being a request from an application;

convert the received first input into a second input, the second input being an input for a plurality of managers to fulfill the request; and output the second input to the plurality of managers, wherein the second input includes inputs for the plurality of managers including:
- a first manager configured to manage control of a motion system mounted on the vehicle,
- a second manager configured to manage control of a heating system mounted on the vehicle, and
- a third manager configured to manage control of activating and stopping power supply to the motion system and the heating system, under a condition that the motion system and the heating system receive an instruction from the plurality of managers.

2. The information processing device according to claim 1, wherein:
the processor is configured to open information to public, the information being related to at least one of the second input, statuses of management by the plurality of managers, and a status of the motion system and the heating system, and
the application is configured to determine a start and an end of the request by referring to the information open to the public.

3. A vehicle comprising the information processing device according to claim 1.

4. The information processing device according to claim 1, wherein the inputs for the plurality of managers further include:
a fourth manager configured to manage control of selecting a type of power source and adjusting power supply balance for the motion system and the heating system.

5. An information processing method to be executed by a processor of an information processing device to be mounted on a vehicle, the information processing method comprising:
receiving a first input via an application programming interface, the first input being a request from an application;

converting the received first input into a second input, the second input being an input for plurality of managers to fulfill the request; and outputting the second input to the plurality of managers, wherein the second input includes inputs for the plurality of managers including:
- a first manager configured to manage control of a motion system mounted on the vehicle,
- a second manager configured to manage control of a heating system mounted on the vehicle, and
- a third manager configured to manage control of activating and stopping power supply to the motion system and the heating system, under a condition that the motion system and the heating system receive an instruction from the plurality of managers.

6. A non-transitory storage medium storing instructions that are executable by one or more processors of an information processing device to be mounted on a vehicle and that cause the one or more processors to perform functions comprising:
receiving a first input via an application programming interface, the first input being a request from an application;

converting the received first input into a second input, the second input being an input for a plurality of managers to fulfill the request; and outputting the second input to the plurality of managers; wherein the second input includes inputs for the plurality of managers including:
- a first manager configured to manage control of a motion system mounted on the vehicle,
- a second manager configured to manage control of a heating system mounted on the vehicle, and
- a third manager configured to manage control of activating and stopping power supply to the motion system and the heating system, under a condition that the motion system and the heating system receive an instruction from the plurality of managers.

* * * * *